Patented Dec. 20, 1938

2,140,507

UNITED STATES PATENT OFFICE 2,140,507

PRODUCTION OF ETHYL CHLORIDE

Leonard C. Chamberlain, Jr., Jack L. Williams, and Robert D. Blue, Midland, Mich., assignors to The Dow Chemical Company, Midland, Mich., a corporation of Michigan No Drawing. Application August 26, 1936
Serial No. 98,098

3 Claims. (Cl. 260—663)

The present invention relates to methods for the preparation of ethyl chloride by the direct addition of hydrogen chloride to ethylene.

In one method for carrying out said addition reaction, a mixture of ethylene and hydrogen chloride is passed into a substantially anhydrous liquid catalytic medium maintained at a temperature between about −10° and about 12° C. Such a medium can be prepared by dissolving or suspending certain metal chlorides, e. g. aluminum chloride or ferric chloride, in a suitable chlorinated aliphatic hydrocarbon. In addition reactions of this type the metal chloride catalyst is always gradually poisoned, which necessitates the intermittent addition of fresh catalyst to the liquid medium. Under the best conditions this method for preparing ethyl chloride results in the formation of only about 5 to 20 pounds of ethyl chloride per pound of catalyst used up in the reaction.

We have now found an improvement in such procedure whereby we are able to obtain yields of over 100 pounds of ethyl chloride per pound of catalyst. We have also found that by our method the catalytic efficiency of the liquid reaction bath is markedly increased, thereby permitting (1) the reaction of a greater volume of mixed ethylene and hydrogen chloride gases per unit volume of catalyst medium per hour, and (2) a substantially complete addition of the mixed reactant gases during a single pass through the reaction zone. The invention, then, consists in the method hereinafter fully described and particularly pointed out in the claims.

In our improved method for carrying out the addition reaction between ethylene and hydrogen chloride under the aforementioned conditions, the liquid catalytic medium is warmed for a short time to a temperature above 12° C. but below the boiling temperature thereof, and preferably to a temperature between 20° C. and about 50° C., each time fresh catalyst is added thereto. Thereafter it is cooled to the preferred or usual reaction temperature, that is, below 12° C.

The warming and cooling steps may be carried out without interrupting the passage of the mixed reactant gases through the reaction zone, thereby utilizing the heat of reaction of said gases to facilitate the warming-up step, and the movement of said gases in contact with the liquid medium for agitating the same during the warming-up step, thereby preventing local overheating. It is not essential, however, that the reaction be continuous, and the contacting of ethylene and hydrogen chloride with the catalytic bath can be halted during the intermittent additions of catalyst thereto and the accompanying temperature manipulations. Any convenient means of heating and cooling the reaction mixture may be employed, although prolonged localized heating without effective agitation should be avoided, as such treatment tends to poison and inactivate that portion of the catalyst subjected thereto.

The following example illustrates the practice of our invention in a continuous system:

A solution consisting of 201 pounds of propylene chloride, and 5 pounds of aluminum chloride, was continuously circulated through a packed tower provided with an indirect brine cooling system and means to return said solution to the top of the tower. An ethylene-containing gas, of the composition hereinafter given, was fed in at the bottom of the tower and rose counter-current to the flow of catalytic solution. This gas was obtained by the pyrolytic decomposition of a petroleum fraction, followed by chlorination thereof to remove unsaturates higher than ethylene, and had the following composition:

| | Per cent by weight |
|---|---|
| Ethylene | 43 |
| Hydrogen chloride | 6 |
| Methane and homologues | 5 |
| Hydrogen | 44 |
| Air | 2 |

The above gas was fed into the tower at the rate of 5.7 pounds of ethylene, along with 8.0 pounds of hydrogen chloride gas, per hour. The heat of reaction raised the temperature of the circulating liquid catalytic medium to 33° C. in an hour and ten minutes. At the end of this time the brine cooling system was started, and over a two-hour period the temperature of the catalytic medium was reduced to 5° C. During the next 36 hours, 98 per cent of the ethylene passing in contact with the reaction bath was reacted. At the end of this time the efficiency of the catalyst began to decrease, until by the end of the 42 hours only 90 per cent of the ethylene in the gas entering the bottom of the tower was reacted. The circulation of the cooling medium was then cut off, and 10 pounds of aluminum chloride added to the circulating catalytic solution, which warmed up over a period of three hours to a temperature of about 20° C. The catalytic medium was then cooled down over a period of two hours to a temperature of 5° C. In similar manner additional catalyst was intermittently added until, at the end of 191.5 hours, a total of 22 pounds of aluminum chloride had been added. At this time over 85 per cent of the ethylene in the gas entering the tower was still being converted to ethyl chloride in a single pass. The yield of ethyl chloride obtained was 2334 pounds, or 105 pounds of ethyl chloride per pound of catalyst employed.

A modified procedure from that just described may be employed; for instance, a bath consisting of a suitable chlorinated aliphatic hydrocarbon and a catalyst for the addition reaction can be prepared, and a mixture of ethylene-containing gas and hydrogen chloride passed thereinto, the bath being warmed by the heat of reaction to a temperature above 12° C., generally between about 20° C. and about 50° C. Thereafter the bath is cooled to a temperature of about 0° C. and the passage of the reacting gases thereinto continued until the rate of reaction falls off materially. Then a fresh addition of catalyst is made while the bath is permitted to warm up to a temperature in the range above given and held thereat for a short time before being cooled again to the usual temperature below 12° C. Each subsequent addition of the catalyst to the bath is accompanied by a similar raising and lowering of the reaction bath temperature in order to obtain the maximum yield of ethyl chloride from the catalyst employed.

Suitable chlorinated aliphatic hydrocarbons which may be employed in the preparation of the liquid catalytic medium are ethylene chloride, 1.1.2-trichloroethane, tetrachloroethylene, acetylene tetrachloride, propylene chloride, etc. We have found that during operation according to the above example the ethyl chloride product builds up to a concentration of approximately 20 per cent of the catalyst medium, after which the ethyl chloride formed vaporizes from the liquid catalyst bath and is carried along by the exit gases as rapidly as it is formed, such gases being passed into a condenser to recover the ethyl chloride therefrom.

Other modes of applying the principle of our invention may be employed instead of those explained, change being made as regards the process herein disclosed, provided the step or steps stated by any of the following claims or the equivalent of such stated step or steps be employed.

We therefore particularly point out and distinctly claim as our invention:—

1. In a process for making ethyl chloride by reacting ethylene with hydrogen chloride in the presence of a liquid chlorinated aliphatic hydrocarbon containing a catalyst for the reaction and normally maintained at a temperature below the boiling point of ethyl chloride, the steps which consist in intermittently warming said liquid catalytic medium to a temperature above the boiling point of ethyl chloride but below the boiling point of said medium, maintaining said liquid catalytic medium at said elevated temperature until fresh catalyst has been incorporated therein, and then cooling the liquid to a temperature below the boiling point of ethyl chloride.

2. In a process for making ethyl chloride by reacting ethylene with hydrogen chloride in the presence of a liquid chlorinated aliphatic hydrocarbon containing a catalyst for the reaction and normally maintained at a temperature below the boiling point of ethyl chloride, the steps which consist in intermittently warming said liquid catalytic medium to a temperature between 20° C. and 50° C., maintaining said liquid catalytic medium at said elevated temperature until fresh catalyst has been incorporated therein, and then cooling the liquid medium to a temperature below the boiling point of ethyl chloride.

3. In a process for making ethyl chloride, the steps which consist in, reacting ethylene with hydrogen chloride in the presence of a liquid chlorinated aliphatic hydrocarbon containing a catalyst for the reaction at a temperature below the boiling point of ethyl chloride, warming said liquid catalytic medium to a temperature above the boiling point of ethyl chloride but below the boiling point of said medium, maintaining said medium at said elevated temperature for a sufficient period of time to incorporate fresh catalyst therein, then cooling the medium to a temperature below the boiling point of ethyl chloride, and continuing the reaction of ethylene and hydrogen chloride in the presence of said medium.

LEONARD C. CHAMBERLAIN, JR.
JACK L. WILLIAMS.
ROBERT D. BLUE.